United States Patent
Li et al.

(10) Patent No.: US 6,741,555 B1
(45) Date of Patent: May 25, 2004

(54) ENHANCEMENT OF EXPLICIT CONGESTION NOTIFICATION (ECN) FOR WIRELESS NETWORK APPLICATIONS

(75) Inventors: Xiang Li, Beijing (CN); Jing Wu, Ottawa (CA); Shiduan Cheng, Beijing (CN); Jian Ma, Beijing (CN)

(73) Assignee: Nokia Internet Communictions Inc., Mountain View, CA (US)

( * ) Notice: Subject to any disclaimer, the term of this patent is extended or adjusted under 35 U.S.C. 154(b) by 744 days.

(21) Appl. No.: 09/594,463

(22) Filed: Jun. 14, 2000

(51) Int. Cl.[7] .............................................. H04L 12/26
(52) U.S. Cl. ...................................... 370/229; 370/249
(58) Field of Search ................................. 370/229, 230, 370/231, 235, 235.1, 236, 236.2, 249.1, 244, 249, 252, 253, 395.4, 395.52, 412, 468, 329, 345, 349; 709/233, 235

(56) References Cited

U.S. PATENT DOCUMENTS

| | | | | |
|---|---|---|---|---|
| 5,313,454 A | * | 5/1994 | Bustini et al. ............... | 370/231 |
| 5,892,753 A | | 4/1999 | Badt et al. | |
| 6,215,769 B1 | * | 4/2001 | Ghani et al. ................. | 370/230 |
| 6,219,713 B1 | * | 4/2001 | Ruutu et al. ................. | 709/235 |
| 6,252,851 B1 | * | 6/2001 | Siu et al. .................... | 370/236 |
| 6,415,329 B1 | * | 7/2002 | Gelman et al. ............. | 709/245 |
| 6,483,805 B1 | * | 11/2002 | Davies et al. ............... | 370/235 |

FOREIGN PATENT DOCUMENTS

EP 0884874 A1 12/1998

OTHER PUBLICATIONS

"Using Back–Pressure to Improve TCP Performance with Many Flows", Carlos M. Pazos, Juan C. Sanchez Agrelo, and Mario Gerla, UCLA–Computer Science Department, 1999 IEEE.
Allam et al., Standards Track, RFC 2581, "TCP Congestion Control," Apr. 1999.
Floyd et al., Standards Track, RFC 2582, "NewReno Modification to TCP's Fast Recovery," Apr. 1999.
Mathis et al., Standards Track, RFC 2018, "TCP Selective Acknowledgement Options," Oct. 1996.
Ramakrishnan et al., Experimental, RFC 2481, "ECN to IP," Jan. 1999.
Postel (ed.), RFC 793, "Transmission Control Protocol: DARPA Internet Program," Sep. 1981.
Schulzrinne et al., Standards Track, RFC 1889, "RTP," Jan. 1996.
Stevens, Standard Track, RFC 2001, "TCP," Jan. 1997.

\* cited by examiner

*Primary Examiner*—Kwang Bin Yao
(74) *Attorney, Agent, or Firm*—Antonelli, Terry, Stout & Kraus, LLP

(57) ABSTRACT

An Explicit Congestion Notification (ECN) method is disclosed for wireless applications to avoid network congestion in a TCP/IP packet-switched network. Such method comprises transmitting, at a source node, data packets to a destination node, via at least an intermediate node; determining, at the intermediate node, if an incipient congestion is encountered, setting a Congestion Experienced (CE) flag in each data packet to notify congestion; sending, at the destination node, an ECN-Echo acknowledgment packet back to the source node to inform congestion; reducing, at the source node, a congestion window and a transmission rate to avoid congestion; if the packet loss is due to congestion, re-transmitting, at the source node, only a lost packet to the destination node; alternatively, if the packet loss is due to transmission error, re-transmitting, the lost packet to the destination node, while increasing a round-trip timeout but maintaining the same congestion window.

26 Claims, 7 Drawing Sheets

ENHANCEMENT OF EXPLICIT CONGESTION NOTIFICATION (ECN) FOR WIRELESS NETWORK APPLICATIONS

BACKGROUND OF THE INVENTION

1. Technical Field

The present invention relates to congestion control of data networks, and more particularly, relates to a congestion avoidance mechanism for packet-switched networks, especially wireless or mobile networks.

2. Related Art

A data network is a collection of network devices, or nodes interconnected by point-to-point links. Communication links may be wired (i.e., optical fiber) or wireless (i.e., infrared or radio-frequency) for supporting a number of logical point-to-point channels. Each channel may be a bi-directional communication path for allowing commands and message data to flow between two network devices or nodes within the data network. Network devices or nodes may be categorized as either end systems or routers, which are also known as intermediate systems or communication gateways. End systems may include PCs, workstations, mainframes, file servers, storage devices and other types of computers. Router may include a number of communication links for forwarding data arriving over one link onto another link for transmission to an end system or another router.

Generally, end systems both send data to other end stations on the data network and receive data sent by other end systems on the data network. When an end system serves as a sender of data, it is referred to as a source for that data; whereas, when such an end station serves as a receiver of data, it is referred to as a destination for the data. Typically, end systems may act as both sources and destinations depending upon whether they are sending or receiving data. When acting as a source, the end system sends data in the form of messages over a communication link to a router for transferring the messages to an end system or another router.

Each message may comprise a sequence of information bits. Typically, however, the messages sent over the data network are not sent as a continuous, uninterrupted stream of bits. Rather, they are divided up into smaller blocks of information called packets, which are then transmitted individually. Each packet has a predetermined maximum length. In addition to a data field which contains the data to be transferred, a packet also includes a header field which contains control information such as format, identifiers which indicate what portion of the message is contained in the packet, the source of the packet and the intended destination of the packet. When the packets which together contain a message reach the destination, the destination processes them by assembling their data fields into proper order to reconstruct the full message.

One important design objective in data networks is controlling the flow of packets so that such packets may not be transmitted at a faster rate than they can be processed by the routers through which the packets may pass or by the destinations. Even in the simplest data network consisting of two end systems interconnected by a router, for example, the source may flood the destination if it transmits packets faster than they can be processed by the destination. In more complicated networks consisting of many end systems, numerous routers and alternative communication paths between the end systems, the likelihood of problems from excess communication traffic is significantly greater. This becomes especially true as the number of active end systems on the network increases and if communication speeds of the equipment within the network are mismatched. A mismatch may exist if, for example, a router cannot transfer packets as fast as they are being sent to it by the source. A mismatch may also exist between the speed at which the link can transmit packets, namely the link speed, and the rate at which the router can transfer packets. Predictably, as the complexity of the network increases, achieving an acceptable traffic control also becomes more difficult.

On most networks, including TCP/IP packet-switched networks in which Transmission Control Protocol (TCP) [RFC 793, September 1981] may be implemented to ensure high-speed and high-quality data transfer in the Internet, at least two basic mechanisms are normally used for dealing with excess traffic arriving at a destination. One mechanism involves the use of buffers and the other involves flow control. In buffered systems, both the routers and the end systems (i.e., source node and destination node) are provided with buffer memory to handle data overloads. Arriving traffic which exceeds the processing rate of the device is temporarily stored in the buffer memory until the device can process it. Buffers offer a satisfactory solution to excess traffic problems only if the overload is transitory. If the overload persists for too long, the buffers may become full after which the additional packets are rejected or destroyed.

The other mechanism, generally referred to as flow control, deals with the allocation of resources at the destination, such as memory and processing. Generally, in accordance with flow control, the destination sets a limit on the transmission rate at which each source sending data to the destination may transmit that data. The sources and the destinations coordinate the transfer of data by an exchange of messages containing requests and acknowledgments. Before the source starts sending packets, it will send a request to the destination seeking permission to begin transmission. In response to the request, the destination sends a message containing an identification of the number of packets the source may dispatch toward the destination without further authorization. This number is commonly referred to as the window size. The source then proceeds to transmit the authorized number of packets toward the destination and waits for the destination to verify their receipt. After the destination successfully receives a packet, it sends a message back to the source containing an acknowledgment indicating the successful receipt of the packet and, in some cases, authorizing the source to send another packet. In this way, the number of packets on the network traveling from the source toward the destination will never be more than the authorized window size.

Neither of these mechanisms, however, satisfactorily deals with the distribution of traffic within the network. Even with these mechanisms in place, on a busy network it is likely that many sources will simultaneously send traffic over the network to more than one destination. If too much of this traffic converges on a single router in too short a time, the limited buffer capacity of the router will be unable to cope with the volume and the router or communication gateway will reject or destroy the packets. When this happens, the network is said to be congested.

Then the network is congested, network performance degrades significantly. The affected sources have to retransmit the lost or rejected packets. Re-transmissions, however, necessarily use network resources such as buffer storage, processing time and link bandwidth to handle old traffic thereby leaving fewer resources for handling those portions of the messages still waiting to be transmitted for the first time. When that occurs, network delays increase drastically and network throughput drops. Indeed, since some network resources are being dedicated to handling re-transmissions at a time when the network is already experiencing a heavy load, there is a substantial risk of the congestion spreading and locking up the entire network.

A variety of alternative approaches exist for dealing with network congestion. Generally, the approaches fall into two categories. One category involves placing limitations on the amount of traffic which will be permitted on the network at any given time. Examples include the preallocation of buffers at the routers to ensure that memory is available to store arriving packets until they can be forwarded. The other category involves methods of limiting the spread of congestion once it occurs and then extricating the network from its congested state. The second category of approaches for dealing with network congestion is commonly referred to as congestion control. Congestion control typically involves feedback which signals the onset of congestion overflow and instructs end systems to decrease the rate at which they initiate transmission of packets.

Currently, there are several schemes, including the recent proposed use of Explicit Congestion Notification (ECN) mechanisms in the TCP/IP networks to avoid unnecessary delay for packets from low-bandwidth delay-sensitive TCP connections. Such proposals are described, for example, in Floyd, S., "TCP and Explicit Congestion Notification," ACM Computer Communication Review, V. 24 N. 5, October 1994, p. 10–23; Ramakrishnan, K. K., and Floyd, S., "A Proposal to add Explicit Congestion Notification (ECN) to IP," RFC 2481, January 1999; Floyd, Black, and Ramakrishnan, "IPsec Interactions with ECN," internet-draft draft-ietf-ipsec-ecn-02.txt, October, 1999; Ramakrishnan, Floyd, and Davie, "Proposal to Incorporate ECN in MPLS," internet-draft draft-mpls-ecn-00.txt, June, 1999; Jamal Hadi Salim and Uvaiz Ahmed, Performance Evaluation of Explicit Congestion Notification (ECN) in IP Networks, draft-hadi-jhsua-ecnperf-01.txt, March 2000; Uvaiz Ahmed and Jamal Hadi Salim, "Performance Evaluation of Explicit Congestion Notification (ECN) in IP Networks," December 1999; Chris Chen, Hariharan Krishnan, Steven Leung, Nelson Tang, "Implementing Explicit Congestion Notification (ECN) in TCP for IPv6," report for CS 217, December 1997; Prasad Bagal, Shivkumar Kalyanaraman, Bob Packer, "Comparative study of RED, ECN and TCP Rate Control," Technical Report, March 1999.

Generally, Explicit Congestion Notification (ECN) mechanisms are installed in intermediate nodes, such as routers or communication gateways, to detect and notify the incipient congestion in the TCI/IP networks. The router may monitor the average of queue size. When the average of queue size exceeds a designated threshold previously defined, the router sets a mark in the packet to notify the incipient congestion to the destination node. The destination node receives the marked packet, and delivers the notification in backward packet. Then the source node reduces its current data window and its sending speed to allay or avoid the congestion in the TCI/IP networks. However, ECN mechanisms require significant modifications on both the TCP source and destination to control congestion. Further, ECN mechanisms are oriented to wired networks with very small transmission error, known as Bit Error Rate (BER), since the TCP assumes that the packet loss due to damage is extremely rare and the overwhelming majority of lost packets is due to congestion in the Internet.

For wireless networks, however, TCP assumption is generally false—most lost packets are due to errors that occur in the transmission of packets over error-prone media such as infrared or radio-frequency links, as opposed to network congestion. When these errors occur, TCP mistakenly assumes that the network is congested and dramatically reduces its transmission of old and new packets. For example, when a packet is lost, TCP may automatically reset its current data window and threshold, then trap in Slow-Start frequently, which may sharply degrade the throughput of connection. Although there are some algorithms to minimize the impact of losses (such as Fast Retransmit, Fast Recovery and Selected Acknowledgment "SACK") from a throughput perspective, TCP is still sensitive to the loss of one or more individual packets and unnecessarily reduces its sending speed (transmission rate). Further, there is no way to distinguish the packet loss due to Bit Error Rate (BER) from loss due to congestion.

In addition, for wireless networks, the speed of wireless links is often much lower than that of wired links. The great difference of bit rates is easy to cause congestion, which would cause large queues in the period of connection and significantly increase the average delay in the network. Furthermore, the congestion would lead to multiple packet loss at the congested node, which would deteriorate the throughput of a connection for a long period.

Accordingly, there is a need for a more efficient ECN mechanism provided to improve the TCP performance in high-speed packet-switched networks, especially wireless or mobile networks with long transfer delay and high Bit Error Rate (BER). A new ECN mechanism is seriously needed to distinguish congestion packets loss from individual packet loss due to Bit Error Rate (BER), to reject coming into Slow-Start when lost packets are due to Bit Error Rate (BER), and to reduce its sending speed upon detection of incipient congestion notification in order to improve the throughput of connection while minimizing the average of queue size.

SUMMARY OF THE INVENTION

Accordingly, various embodiments of the present invention are directed to a new and improved Explicit Congestion Notification (ECN) mechanism, and associated method, for wireless and/or mobile network applications to avoid network congestion in a TCP/IP packet-switched network. Such an advanced ECN mechanism may be an algorithm installed or integrated into a host and/or a computer readable medium for use in a host for avoiding network congestion. In addition, such an enhanced ECN algorithm may be installed in the host of a packet-switched network which uses wireless or mobile links.

In accordance with an embodiment of the present invention, a method of avoiding congestion in such a network may comprise the steps of: transmitting, at a source node, data packets to a destination node, via at least an intermediate node; determining, at the intermediate node, if an incipient congestion is encountered, and if the incipient congestion is encountered, setting a Congestion Experienced (CE) flag in each data packet which indicates the incipient congestion to notify the incipient congestion to the destination node; receiving, at the destination node, a CE data packet, setting an Explicit Congestion Notification-Echo (ECN-Echo) flag in a header of an acknowledgment (ACK) packet subsequent to the CE data packet received, and sending an ECN-Echo ACK packet back to the source node to inform that the incipient congestion was encountered in the network on the path from the source node to the destination node; upon receipt of the ECN-Echo ACK packet, reducing, at the source node, a congestion window and a transmission rate (sending speed) to avoid the congestion in the intermediate node, and determining if a packet loss is due to congestion or due to a transmission error, when the incipient congestion is still encountered in the network on the path from the source node to the destination node; if the packet loss is due to congestion, re-transmitting, at the source node, only a lost packet to the destination node, via the intermediate node; and if the packet loss is due to the transmission error, re-transmitting, at the source node, the lost packet to the destination node, via the intermediate node, while increasing a round-trip timeout (RTO) but maintaining the same congestion window.

Specifically, the ECN-Echo ACK packet is transmitted from the destination node back to the source node without delay, and each CE data packet can only invoke a single ECN-Echo ACK packet, and not a series of ECN-Echo ACK packets. The incipient congestion is encountered, when the average of queue size in the intermediate node exceeds a designated threshold. The packet loss is determined due to congestion, if there is an ECN-Echo flag in the prior data window; otherwise, such a packet loss is determined due to the transmission error, if there is no ECN-Echo flag in the prior data window. This way an original sending speed (transmission rate) can be recovered quickly so as to improve the throughput of connection.

In accordance with another embodiment of the present invention, a data network for wireless and/or mobile network applications may comprise a source node for transmitting data packets; a destination node for receiving the data packets from the source node; and at least one intermediate node disposed between the source node and the destination node, for monitoring the average of queue size of incoming data packets from the source node and providing an Explicit Congestion Notification (ECN) to the destination node; wherein the destination node, in response to ECN, sends an ECN-Echo acknowledgment packet back to the source node to inform that congestion was encountered in the network on the path from the source node to the destination node; wherein the source node, in response to the ECN-Echo acknowledgment packet, reduces a congestion window and a transmission rate (sending speed) to avoid the congestion in the intermediate node, and determines if a packet loss is due to congestion or due to a transmission error, when congestion is still encountered in the network; and wherein the source node re-transmits only a lost packet to the destination node, via the intermediate node if the packet loss is due to congestion, and alternatively, re-transmits the lost packet to the destination node, via the intermediate node, while increasing a round-trip timeout (RTO) but maintaining the same congestion window if the packet loss is due to the transmission error in order to improve the throughput of connection.

In accordance with yet another embodiment, the present invention relates to a computer readable medium having an enhanced Explicit Congestion Notification (ECN) algorithm for wireless network applications, when executed by a host system, performs the following: transmitting data packets to a remote system, via an intermediate system which is installed to set a Congestion Experienced (CE) flag in each data packet experiencing congestion; receiving an ECN-Echo ACK packet sent back from to the remote system, in response to reception of a CE data packet, indicating that congestion was encountered on the path to the remote system; upon receipt of the ECN-Echo ACK packet, reducing a congestion window and a transmission rate to avoid the congestion in the intermediate system; determining if a packet loss is due to congestion or due to a transmission error, when congestion is still encountered on the path to the remote system; if the packet loss is due to congestion, re-transmitting only a lost packet to the remote system, via the intermediate system; and if the packet loss is due to the transmission error, re-transmitting the lost packet to the remote system, via the intermediate system, while increasing a round-trip timeout (RTO) but maintaining the same congestion window.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF EMBODIMENTS OF THE INVENTION

The present invention is applicable for use with all types of data networks, including packet-switched networks, interconnected systems of such networks and transmission protocols used for data transfer between host systems in such networks. However, for the sake of simplicity, discussions will concentrate mainly on the use of Transmission Control Protocol (TCP) as a highly reliable host-to-host protocol between host systems in TCP/IP networks including the Internet, and in interconnected systems of such networks.

Figure 1A:
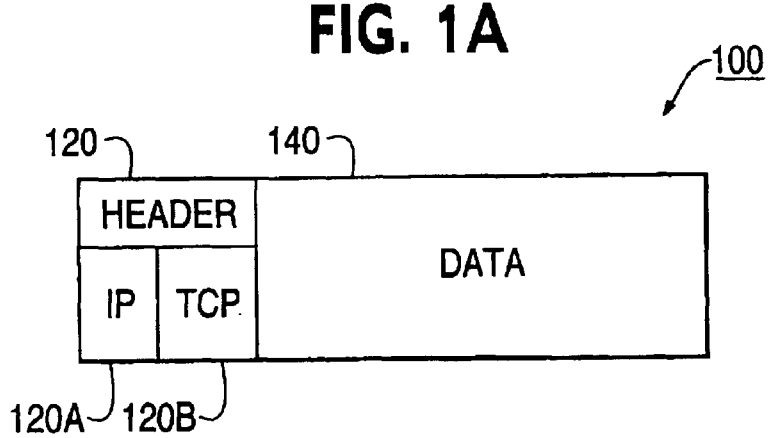
FIG. 1A and FIG. 1B illustrate a data packet for use in a packet-switched network according to an embodiment of the present invention.
Figure 1B:
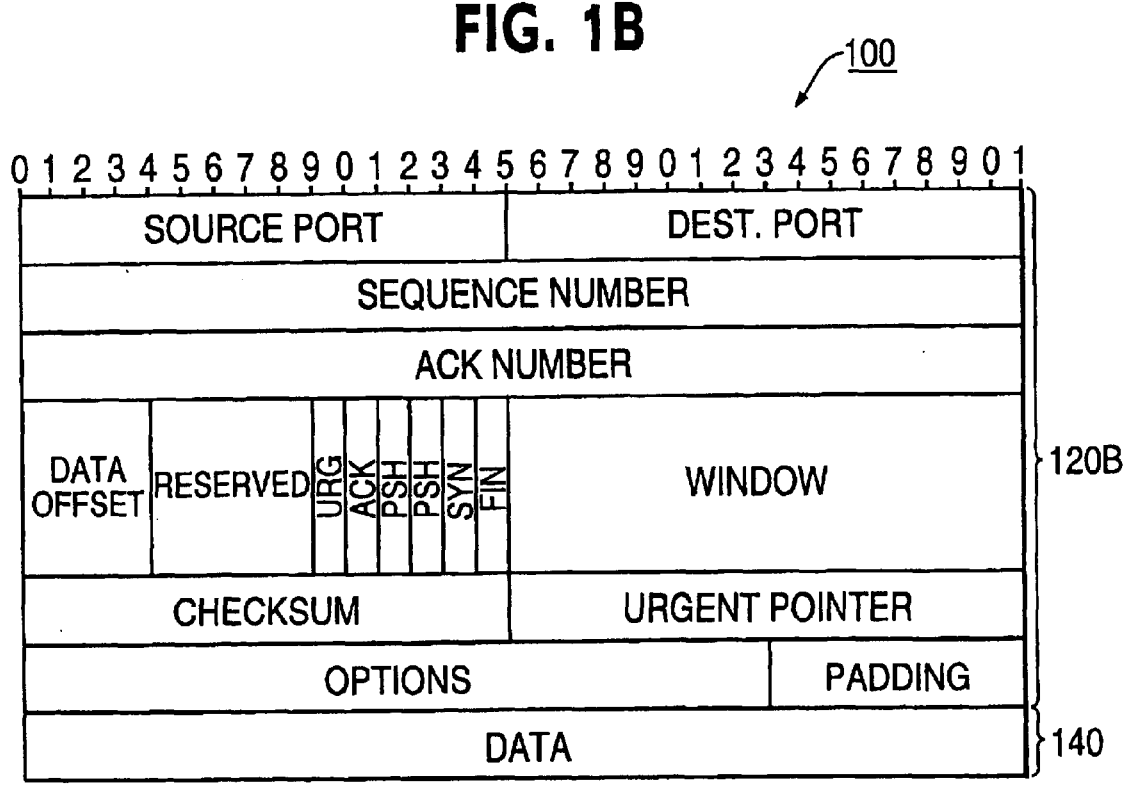

Attention now is directed to the drawings and particularly to FIGS. 1A–1B, a data packet for use in a packet-switched network according to an embodiment of the present invention is illustrated. As shown in FIG. 1A, a data packet 100 consists of a segment of data 140 and a small header 120 prepended to the data 140. The header 120 may contain an Internet Protocol (IP) header 120A and a Transmission Control Protocol (TCP) header 120B which follows the IP header 120A for supplying information specific to the TCP protocol. The IP header 120A may contain several information fields, including, for example, Internet Protocol (IP) addresses fields (Internet address, generally consisting of a network identifier and a host identifier), a version field used to specify which version of the IP is represented in the IP packet (for example, IP Version 4 and IP Version 6), a type of service field used to specify how the IP packet is to be handled in IP-based networks which offer various service qualities, and a header checksum field used to verify transmission error.

FIG. 1B illustrates an example TCP header format of the TCP header 120B, as described by the classical TCP specification [RFC 793, September 1981], including Source Port Number, Destination Port Number, Sequence Number, Acknowledgment Number, Data Offset, Reserved Field for future use, Control Bits including URG (Urgent Pointer field significant), ACK (Acknowledgment field significant), PSH (Push Function), RST (Reset the connection), SYN (Synchronize sequence numbers) and FIN (no more data from sender), Window, Checksum, Urgent Pointer, Variable Options, and Padding. Acknowledgment Number may contain 32 bits for indicating the value of the next sequence number the TCP source is expecting to receive. Data Offset may contain 4 bits for indicating where the data begins. The Window may contain 16 bits for indicating the number of data octets beginning with the one indicated in the acknowledgment field which the TCP sender of the data segment is willing to accept. The Checksum may contain 16 bits for indicating the complement sum of all 16 bit words in the header and text. The Urgent Pointer may contain 16 bits for indicating the sequence number of the octet following the urgent data. The variable options may contain a multiple of 8 bits in length and may be included in the checksum. The variable header padding may be used to ensure that the TCP header ends and data begins on a 32 bit boundary. For purposes of Explicit Congestion Notification (ECN) to IP as described hereinbelow, one bit (preferably bit #9) in the Reserved Field of the TCP header 120B may be designated as the ECN-Echo flag so that the destination node can inform the source node when a CE packet has been received. Another bit (preferably bit #8) in the Reserved Field of the TCP header 120B may be designated as the Congestion Window Reduced (CWR) flag so that the source node can inform the destination node that the congestion window has been reduced and that the destination node can determine when to stop setting the ECN-Echo flag. In addition, bit #6 and bit #7 of the IPv4 TOS (Type of Service) octet may be designated as ECN-Capable Transport (ECT) bit and CE bit, respectively. ECT bit (or ECT flag) may be set by the source node to indicate that the end systems of the transport protocol are ECN-capable. In contrast, the CE bit (or CE flag) may be set by the intermediate node 130 to indicate congestion to the end systems.

Figure 2:
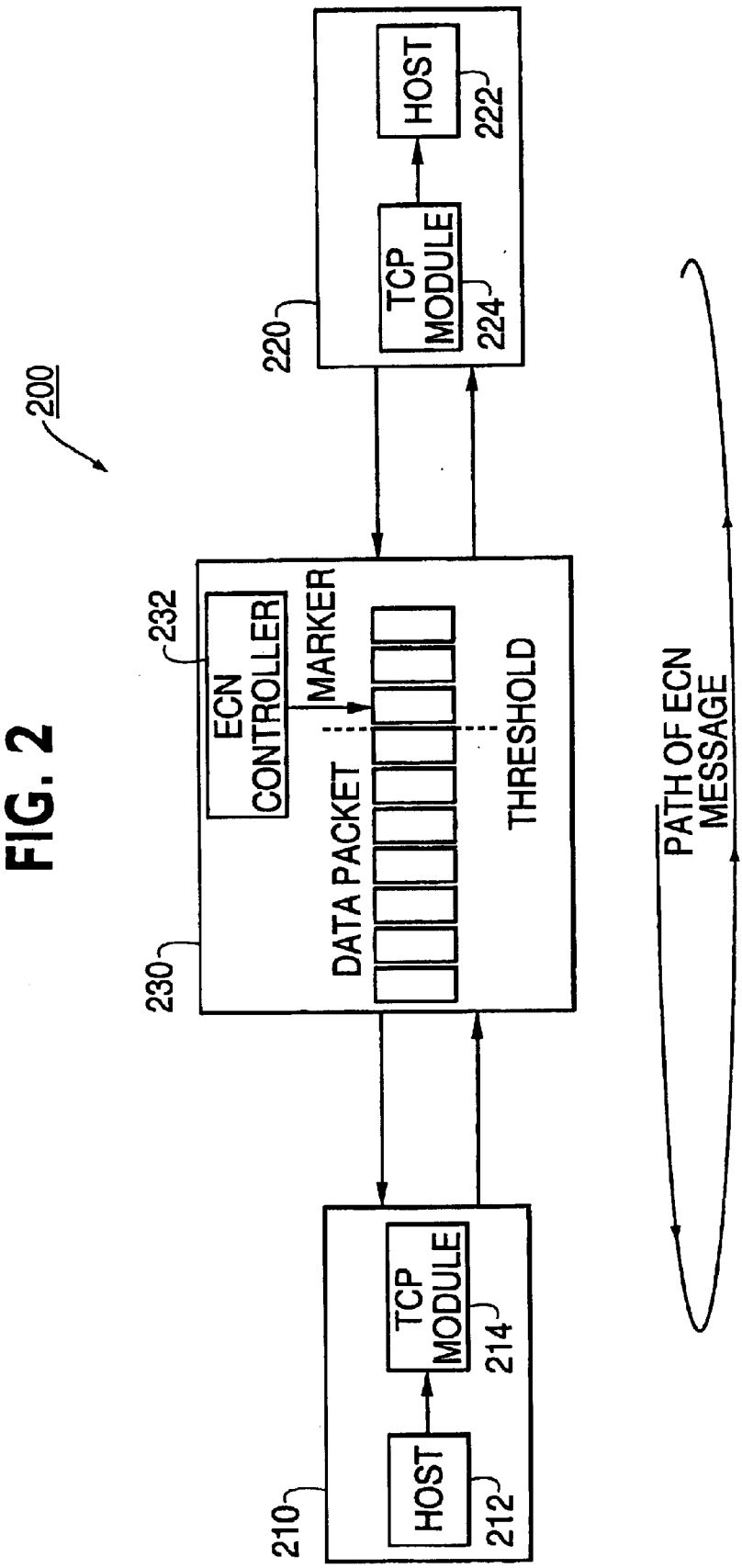
FIG. 2 illustrates an example packet-switched network including an existing Explicit Congestion Notification (ECN) mechanism installed therein for avoiding congestion in the network.

FIG. 2 illustrates a simple packet-switched network 200 having an example Explicit Congestion Notification (ECN) mechanism installed therein for avoiding congestion in the network. As shown in FIG. 2, the packet-switched network 200 includes, for example, a source node 210, a destination node 220, and an intermediate node 230. IP bandwidth-limited links 202 and 204 may be utilized to connect the source node 210 to the destination node 220. The IP bandwidth-limited links 202 and 204 may represent a low bandwidth link such as, for example, an integrated service digital service (ISDN) link and a modem link that connect to the source node 210 and the destination node 220. Alternatively, the TCP/IP bandwidth-limited links 202 and 204 may include an TCP/IP network of an Internet Service Provider (ISP), an Internet and different source and destination networks, including, for example, a packet-switched network that provides linkage between the source node 210 and the destination node 220.

The source node 210 and the destination node 220 are known as end systems which may correspond to PCs, workstations, mainframes, file servers, storage devices and other types of computers. The intermediate node 230 may correspond to a router or a communication gateway containing a number of communication links for forwarding data arriving over one link onto another link for transmission to an end system or another router.

In one embodiment, the source node 210 may include, but not limited to, a host 212 and a TCP module 214. Likewise, the destination node 220 may include, but not limited to, a host 222 and a TCP module 224. Both the TCP modules 214 and 224 may be installed independently from respective host, or may be installed in respective host. Alternatively, the TCP modules 214 and 224 may reside in respective network interface card (NIC) (not shown) installed in the source node 210 and destination node 220, respectively.

In the source node 210, the host 212 generates data which is forwarded to the TCP module 114. The TCP module 214 of the source node 210 transforms incoming data from host 212 into IP packets 100 and injects the IP packets 100 into the IP-based network 200. The rate of that IP packets are injected into the TCP/IP network 200 and the outward flow of IP packets 100 are controlled and managed by the TCP module 214 to avoid congestion and to limit bandwidth usage of IP packets in the TCP/IP network 200. The TCP/IP network 200 accepts incoming IP packets 100 and forwards the same to the destination node 220 according to the information contained in the IP header 120. The TCP module 224 of the destination node 220 receives the IP packets 100 from the TCP/IP network 200, transforms the same into data and forwards the data to the host 222.

Included in the intermediate node 230 is an Explicit Congestion Notification (ECN) controller 232 used to detect and notify the incipient congestion to the destination node 220 in the TCP/IP network 200. Generally, the ECN controller 232 of the intermediate node 230 monitors the average queue size of incoming data packets 100 for explicit congestion notification. When the average queue size of incoming data packets 100 exceeds a designated threshold defined, the ECN controller 232 of the intermediate node 230 sets a mark in the packet 100 to notify the incipient congestion to the destination node 220. In particular, the ECN controller 232 sets a Congestion Experienced (CE) bit in the header 120 of the data packet 100 to indicate congestion to the end nodes, including the source node 210 and the destination node 220. The destination node 220 then receives the marked data packet (CE packet—a packet that has the CE bit set), and delivers the notification in backward data packet to the source node 210. The source node 210, using slow start and congestion avoidance algorithms, reduces its current windows and its sending speed to allay or avoid the congestion in the TCI/IP network 200.

More specifically, during the TCP connection setup (initialization) phase, the source and destination TCP modules 214, 224 of the source node 210 and the destination node 220 exchange information about their desire and/or capability to use Explicit Congestion Notification (ECN). The TCP module 214 of the source node 210 may set the ECT bit in the IP header of data packets to indicate to the intermediate node 230 that the CE bit of such data packets may be marked by the ECN controller 232 of the intermediate node 230.

During a TCP connection using ECN, the ECN controller 232 of the intermediate node 230 sets a Congestion Experienced (CE) bit in the header 120 of the packet 100 to indicate congestion to the end nodes, including the source node 210 and destination node 220, when the average queue size of incoming data packets 100 exceeds a designated threshold. Upon receipt of a CE data packet at the destination node 220, the TCP module 224 of the destination node 220 sets the ECN-Echo flag in the TCP header of the subsequent acknowledgment (ACK) packet. If there is any ACK withholding implemented, as in current "delayed-ACK" TCP implementations where the destination node 220 can send an ACK for two arriving data packets, then the ECN-Echo flag in the ACK packet will be set to the OR of the CE bits of all of the data packets being acknowledged. That is, if any of the received data packets are CE packets, then the returning ACK has the ECN-Echo flag set.

In order to provide robustness against the possibility of a dropped ACK packet carrying an ECN-Echo flag, the destination node 220 must, however, set the ECN-Echo flag in a series of ACK data packets. The destination node 220 then uses the CWR flag to determine when to stop setting the ECN-Echo flag.

When an ECN-Capable TCP reduces its congestion window (CWND) for any reason (because of a retransmit timeout, a Fast Retransmit, or in response to an ECN Notification), the TCP module 214 of the source node 210 sets the CWR flag in the TCP header of the first data packet sent after the window reduction. If that data packet is dropped in the TCP/IP network, then the source node 210 will have to reduce the congestion window (CWND) again and retransmit the dropped packet. As a result, the Congestion Window Reduced (CWR) message may be reliably delivered to the destination node 220.

After an ACK data packet is sent with the ECN-Echo bit set, the TCP module 224 of the destination node 220 continues to set the ECN-Echo flag in ACK packets until a CWR packet (a packet with the CWR flag set) is received. After receipt of the CWR packet, acknowledgments for subsequent non-CE data packets do not have the ECN-Echo flag set. If another CE packet is received by the destination node 220, the destination node 220 may once again send ACK packets with the ECN-Echo flag set. While the receipt of a CWR packet does not guarantee that the source node 210 received the ECN-Echo message, this does indicate that the source node 210 reduced its congestion window at some point after it sent the data packet for which the CE bit was set.

However, existing ECN mechanisms, as described with reference to FIG. 2, are cumbersome since the TCP module 214, 224 of the respective source node 210 and the destination node 220 require much modification for congestion control, and the TCP module 214 of the source node 210 may set the CWR flag for several reasons which may confuse the TCP module 224 of the destination node 220.

In addition, existing ECN mechanisms are oriented to wired networks with very small Bit Error Rate (BER), since the TCP assumes that the packet loss due to damage is extremely rare and the overwhelming majority of lost packets is due to congestion in the Internet. For wireless networks, however, most lost packets are due to errors that occur in the transmission of packets over error-prone media such as infrared or radio-frequency links, as opposed to network congestion. When these errors occur, TCP mistakenly assumes that the network is congested and dramatically reduces its transmission of old and new packets. For example, when a data packet is lost, TCP automatically resets its current window and threshold, then traps in Slow-Start frequently, which may sharply degrade the throughput of connection. Although there are available algorithms to minimize the impact of losses (such as Fast Retransmit, Fast Recovery and Selected Acknowledgment "SACK") from a throughput perspective, TCP is still sensitive to the loss of one or more individual data packets and unnecessarily reduces its sending speed. Further, there is no way to distinguish the packet loss due to Bit Error Rate (BER) from loss due to congestion.

Moreover, for wireless networks, the speed of wireless links is often much lower than that of wired links. The great difference of bit rates is easy to cause congestion, which would cause large queues in the period of connection and significantly increase the average delay in the network. Furthermore, the congestion would lead to multiple packet loss at the congested node, which would deteriorate the throughput of a connection for a long period.

Figure 3:
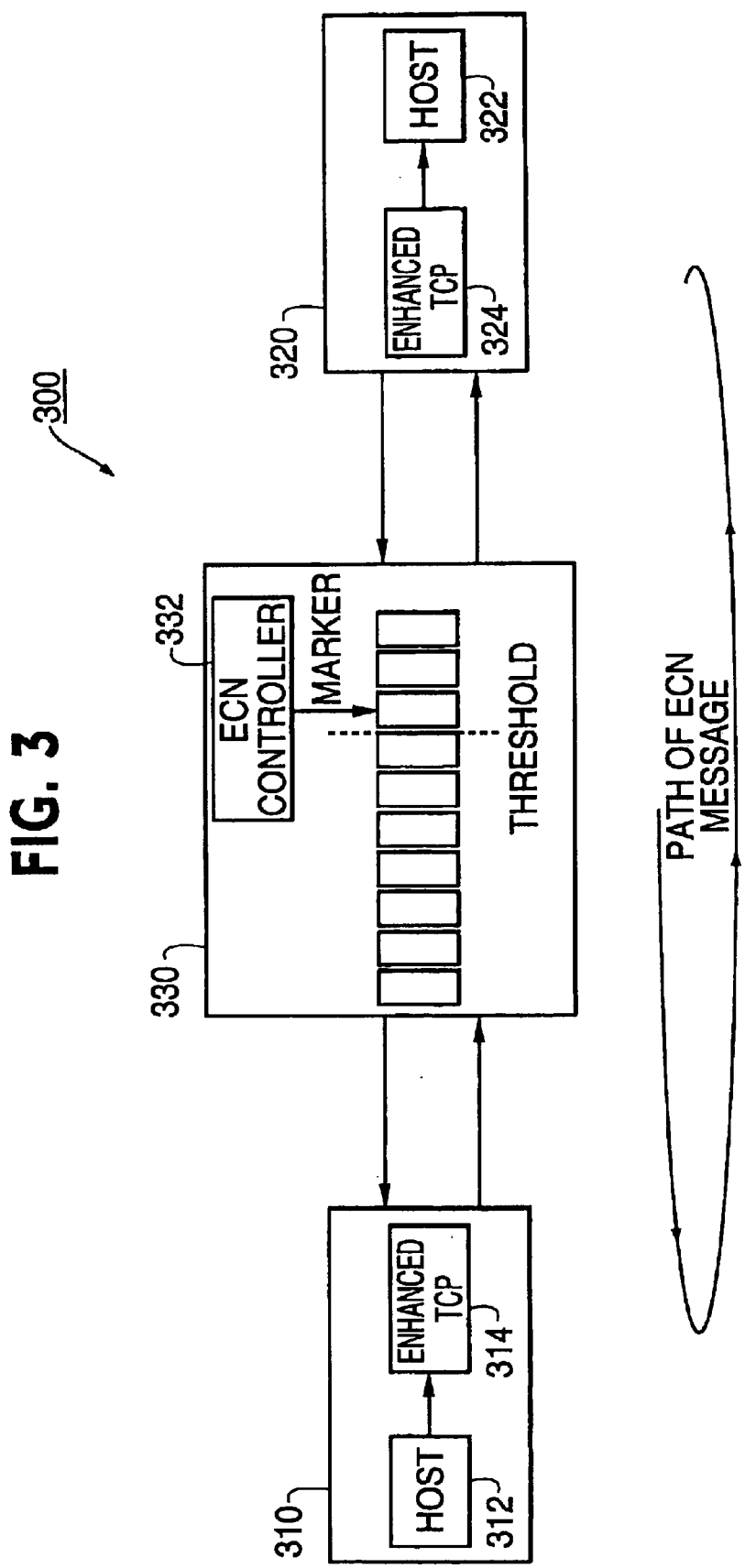
FIG. 3 illustrates an example packet-switched network including a novel and advanced Explicit Congestion Notification (ECN) mechanism installed therein for avoiding congestion in the network according to an embodiment of the present invention.

Turning now to FIG. 3, an example packet-switched network including a novel and advanced Explicit Congestion Notification (NEW-ECN) mechanism installed therein for avoiding congestion in the network according to an embodiment of the present invention is illustrated. As shown in FIG. 3, the packet-switched network 300 includes the same components, such as a source node 310, a destination node 320, and an intermediate node 330. However, the communication links used to connect a source node 310 to a destination node 320 correspond to wireless links 306. In addition, enhanced TCP modules 314 and 324 of the respective source node 310 and destination node 320 contain several modifications and re-configurations for purposes of improving the throughput of connection and the TCP performance in high-speed packet-switched networks, especially wireless or mobile networks with long transfer delay and high Bit Error Rate (BER). The enhanced TCP modules 314 and 324 of the respective source node 310 and destination node 320 are also configured to distinguish congestion packets loss from individual packet loss due to Bit Error Rate (BER), to reject coming into Slow-Start when lost packets are due to Bit Error Rate (BER), and to reduce its sending speed upon detection of incipient congestion notification. Such enhancements to the TCP modules 314 and 324 may be implemented by a NEW-ECN algorithm or a software module configured to detect and notify the incipient congestion and distinguish congestion packet loss from individual packet loss due to Bit Error Rate (BER). The NEW-ECN algorithm implementation may rely on the use of standard programming methods using high level program languages, such as C, C++ and Visual Basic, and a general purpose (host) processor. The NEW-ECN algorithm may be integrated into an existing operating system (OS) of a host processor (i.e., end node including a source node and a destination node) and/or a computer readable medium for use in a host processor (i.e., end node) for detecting and notifying the incipient congestion in the TCP/IP network 300. Alternatively, the NEW-ECN algorithm may be integrated into an existing ECN algorithm as described with reference to FIG. 2.

One example implementation of the New-ECN algorithm installed, for example, at the TCP module 314 of the source node 310 (and the TCP module 324 of the destination node 320) may be depicted with the following pseudo-code:

```
Initialization:
    The source node (TCP sender) and the destination node (TCP
receiver) contact with each other to enable ECN algorithm as described
in [RFC2481].
Then
...
If ECN arrives
    If no ECN has taken effect in the pre-windows or in one RTT time
        Halve the CWND;
        Set SSTHRESH=CWND;
        Come into the state of congestion avoidance;
    Else
        Ignore the ECN message;
    EndIf;
EndIf;
If Timeout occurs with ECN proceeding in the pre-windows or in the
same RTT time
    Retransfer the lost packet;
EndIf;
If Timeout occurs without ECN proceeding
    Retransfer the lost packet;
    Double the RTO value;
EndIf.
```

Such pseudo-code may be implemented using high level programming languages, such as C, C++ and Visual Basic. The NEW-ECN algorithm implementation may, however, operate based on the following assumptions:

(1) All congested intermediate nodes such as routers or gateways employ ECN algorithms or Internet Control Message Protocol (ICMP) messages (which provide diagnostic information and report error conditions). In wireless networks (especially in satellite networks, where bandwidth is carefully managed using private links and the connection path is nearly fixed, congested nodes can be expected), congested routers are usually edge access nodes or wireless access nodes using ECN algorithms for congestion notification.

(2) The possibility of all CE-marked data packets or all ECN-Echo marked ACKs losing in wireless links because of BER may be ignored since it is unlikely that a series of sequential packets are all lost due to BER.

(3) Before some incoming data packets may be dropped by an intermediate node such as a router, the average of queue size in the router would have exceeded the designated threshold for a long period. During this period, CE flags would have been marked in a series of data packets, and a series of respondent ACKs with ECN-Echo would have been sent back. Therefore the source node 310 would have received the ECN notification, reduced the congestion windows and slowed the bit rate to avoid the incipient congestion in the router. If overflows in the router still occur, the TCP module 314 of the source node 310 would know that these packets loss are due to congestion because some ECN-Echoes have been received just now (in the same data window).

(4) Packet loss following ECN-Echo may be treated as packet loss in an intermediate node such as a router, while packet loss without ECN-Echo proceeding may be treated as packet loss in the wireless links due to BER or Retransmission Timeout. This way two types of packet loss may be distinguished.

In addition, the NEW-ECN algorithm implementations also incorporates the following principles:

(1) The enhanced TCP module 324 of the destination node 320 may be modified or re-configured to perform following functions. When receiving a CE data packet, the destination node 320 sets the ECN-Echo flag in the TCP header of a subsequent ACK packet, and sends the same without delay. However, in the next ACK packet, ECN-Echo will not be set by the destination node 320, unless the following data packet is marked with a CE bit as well. As a result, only one CE packet can invoke only one ACK marked with ECN-Echo, not a series of ECN-Echo ACKs as described with reference the ECN mechanism of a packet-switched network 200 shown in FIG. 2.

(2) Similar to the ECN mechanism of a packet-switched network 200 shown in FIG. 2, the destination node 320 reacts to congestion at most once per window of data (i.e., at most of once per round-trip time "RTT"). However, in the New-ECN mechanism according to an embodiment of the present invention, the source node 310 does not need to respond to the CWR information at all, because the TCP module 324 of the destination node 320 does not send ECN-Echo when no CE packet arrives.

(3) When Retransmission Timeout occurs without an ECN-Echo or an ICMP message, packet loss may be treated as packet loss because of BER or because that the value of TCP Timeout is too small. The value of TCP Timeout may be DOUBLED, but the congestion windows (CWND) remain unchanged. As a result, the TCP module 314 of the source node 310 can be insensitive to individual packet loss in links and the whole TCP connection can avoid unnecessary Slow-Start.

(4) When Retransmission Timeout occurs with an ECN-Echo or an ICMP message, packet loss may be treated as packet loss because of congestion in routers. Since an ECN-Echo has been received and the congestion window "CWND" has been reduced, the TCP Timeout may not cause the congestion window "CWND" to reduce again. And the TIMEOUT value may remain unchanged in the same window after an ECN-Echo has been received. Therefore, even when serious overflows unfortunately occur in an intermediate node 330 such as a router or a communication gateway, the TCP module 314 of the source node 310 can avoid exponential increase of TIMEOUT value and can recover quickly.

Specifically, the New-ECN mechanism may rely upon the same TCP connection setup (initialization) phase to establish connection between the source and destination TCP modules 314, 324 of the source node 310 and the destination node 320. However, the NEW-ECN mechanism has modified both the TCP modules 314 and 324 of the source node 310 and the destination node 320 as follows:

"TCP module 324 of the destination node 320":

When TCP receives a CE data packet at the destination end-system, the TCP module 324 sets the ECN-Echo flag in the TCP header of the next ACK packet. This ACK should be transferred without delay. And each data packet with CE flag can only invoke one ACK with ECN-echo flag.

"TCP module 314 of the source node 310":

For a TCP connection using ECN, data packets are transmitted with the ECT bit set in the IP header (set to a "1"). If the TCP module 314 of the source node 310 receives an ECN-Echo ACK packet (that is, an ACK packet with the ECN-Echo flag set in the TCP header), then the source node 310 knows that congestion was encountered in the network on the path from the source node 310 to the destination node 320. The indication of congestion should be treated just as a congestion loss in non-ECN-Capable TCP. That is, the TCP module 314 of the source node 310 halves the congestion window "CWND" and reduces the slow start threshold "SSTHRESH". The TCP module 314 of the source node 310 does NOT increase the congestion window "CWND" in response to the receipt of an ECN-Echo ACK packet.

A critical condition is that TCP does not react to congestion indications more than once every window of data (or more loosely, more than once every round-trip time RTT). That is, the congestion window "CWND" should be reduced only once in response to a series of dropped and/or CE packets from a single window of data. In addition, the TCP module 314 of the source node 310 should not decrease the slow-start threshold, SSTHRESH, if it has been decreased within the last round trip time "RTT". However, if any re-transmitted packets are dropped or have the CE bit set, then this is interpreted by the TCP module 314 of the source node 310 as a new instance of congestion.

If a packet loss is detected by the TCP module 314 of the source node 310, the source node 310 determines the reason of packet loss. For example, if there is an ECN-echo flag in the prior window, the packet loss will be treated as the result of congestion. Otherwise, the packet loss will be treated as a transfer error. In the case of congestion, since ECN echo has invoked the reduction of the congestion window "CWND", the TCP module 314 of the source node 310 only retransmits the packet. In the case of transfer error, the TCP module 314 of the source node 310 retransmits the packet, double RTO and keep the same congestion window "CWND", because no congestion occurs in the TCP/IP network 300.

Figure 4:
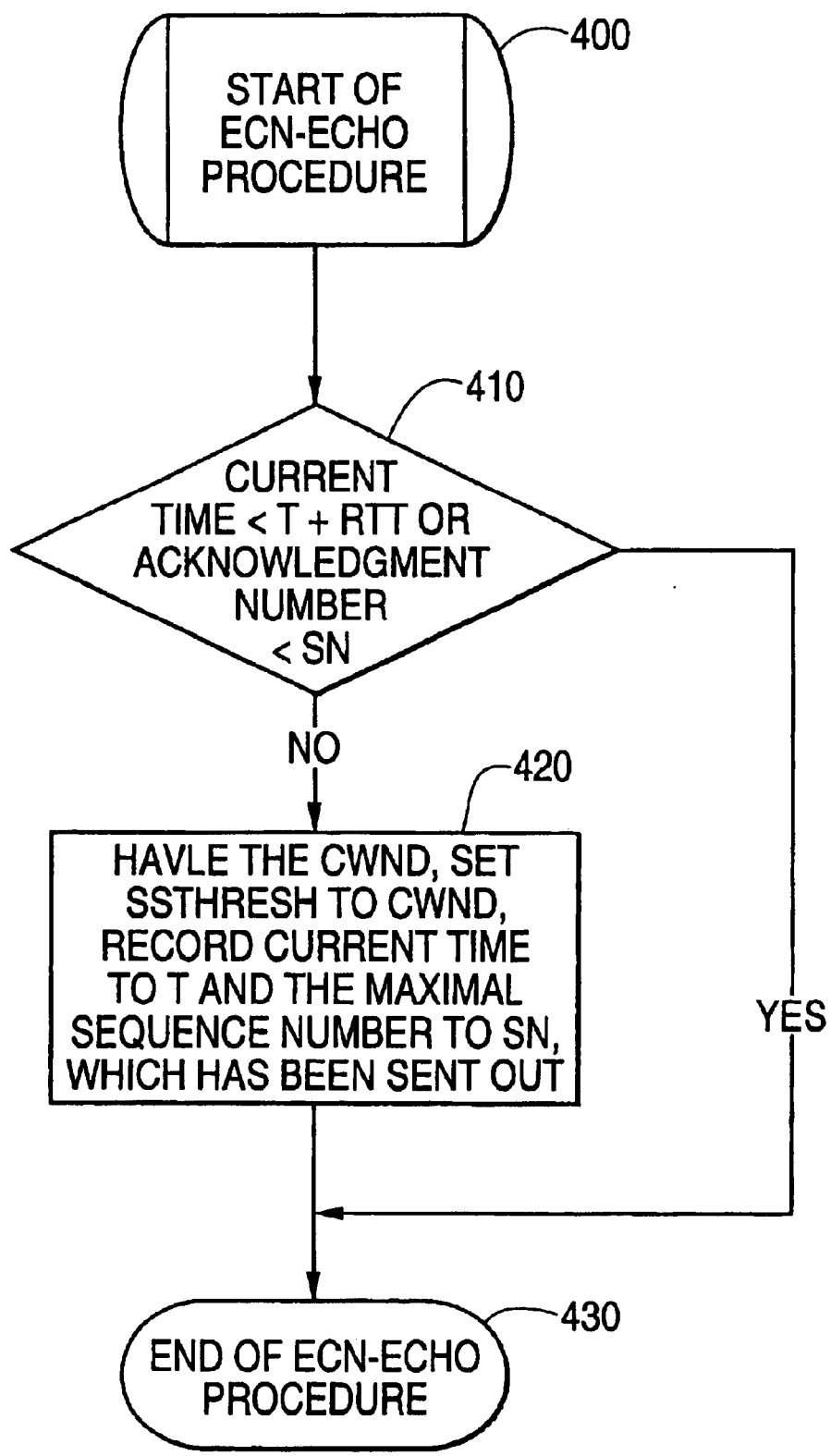
FIG. 4 is a flowchart representation of an ECN-echo procedure of an improved ECN mechanism according to an embodiment of the present invention.

FIG. 4 illustrates an ECN-echo procedure of the TCP module 314 of the source node 310 according to an embodiment of the present invention. As shown in FIG. 4, the ECN-Echo procedure is invoked at block 400, when the TCP module 314 of the source node 310 receives an ECN-Echo ACK packet (that is, an ACK packet with the ECN-Echo flag set in the TCP header). Next the TCP module 314 determines whether a current time is less than a recorded time T and a round-trip time (RTT) or whether an acknowledge number is less than a sequence number SN included in the TCP header 120B of a data packet 100 (see FIGS. 1A–1B) at block 420.

If the current time is less than a recorded time T and a round-trip time (RTT) or the acknowledge number is less than the sequence number included in the TCP header 120B of a data packet 100, then the ECN-Echo procedure is terminated at block 430. However, if the current time is not less than a recorded time T and a round-trip time (RTT) or the acknowledge number is not less than a sequence number included in the TCP header 120B of a data packet 100, then the TCP module 314 of the source node 310 halves the congestion window "CWND" and reduces the slow start threshold "SSTHRESH" by setting the slow start "SSTHRESH" to the congestion window "CWND". In addition, the TCP module 314 of the source node 310 also records the current time as "T" and the current maximal sequence number as "SN" that has been sent into the network. Then the TCP module 314 of the source node 310 terminates the ECN-Echo procedure at block 430.

Figure 5:
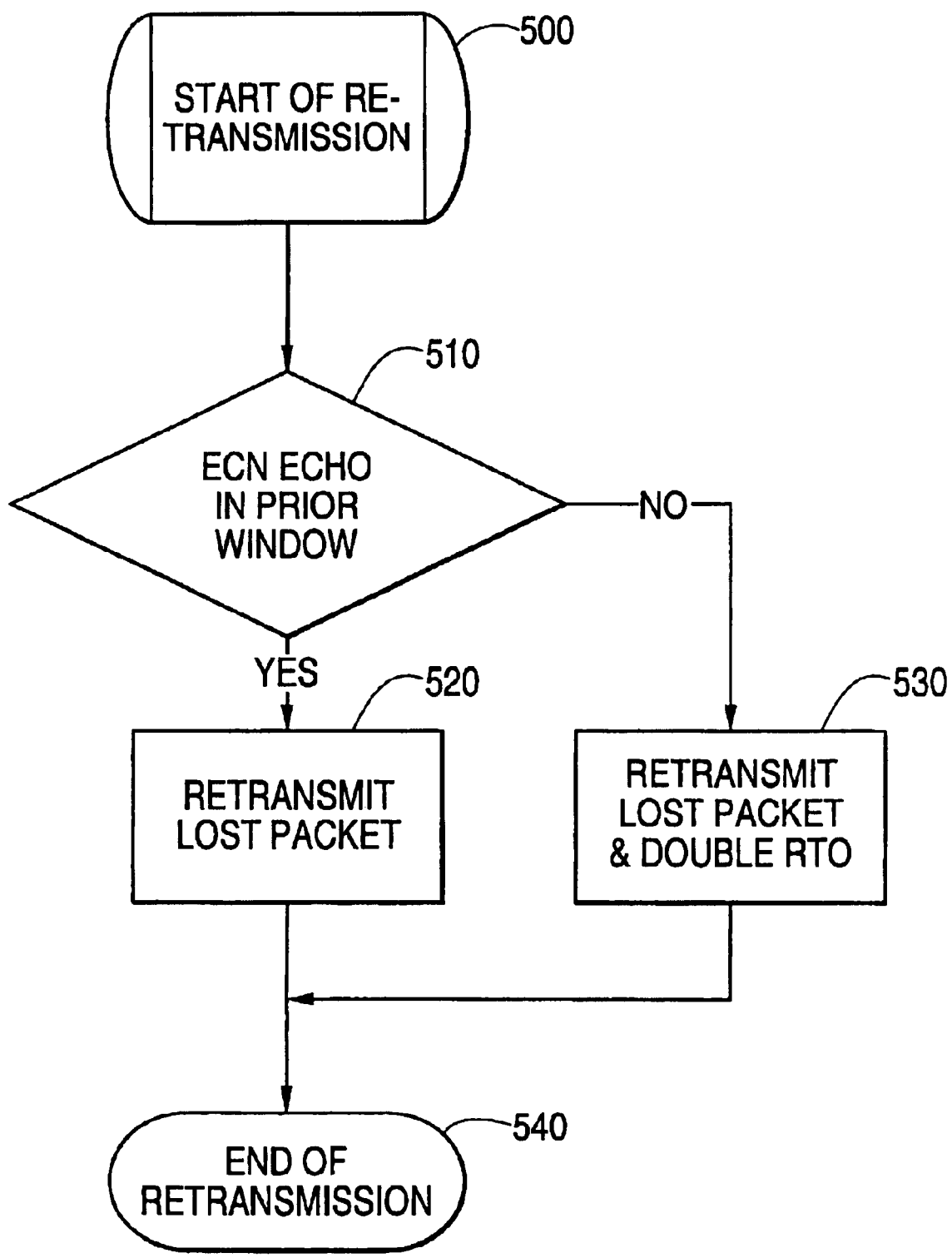
FIG. 5 is a flowchart representation of a packet re-transmission procedure of an improved ECN mechanism according to an embodiment of the present invention.

FIG. 5 illustrates a packet re-transmission procedure of the TCP module 314 of the source node 310 according to an embodiment of the present invention. Such a packet re-transmission procedure may follow the ECN-Echo procedure at block 500. After the packet re-transmission is started at block 500, the TCP module 314 of the source node 310 determines if the ECN-Echo flag is in the prior window of data at block 510. If the ECN-Echo flag is in the prior window of data, the TCP module 314 of the source node 310 treats the packet loss as packet loss due to congestion, and retransmits the lost packet to the destination node 320, via the intermediate node 330 at block 520. However, if the ECN-Echo flag is not in the prior window of data, the TCP module 314 of the source node 310 treats the packet loss as packet loss due to BER (or due to a transfer error), and retransmits the lost packet to the destination node 320, via the intermediate node 330 at block 530. Since no congestion occurs in the TCP/IP network 300, the TCP module 314 of the source node 310 also doubles the round-trip time-out "RTO" while maintaining the same congestion window "CWND" at block 530.

As a result, the NEW-ECN mechanism according to an embodiment of the present invention can maintain a high data throughput and enhance the efficiency when data packets overflow in the congested router by keeping the RTO unchanged. In addition, the recovery time can be avoided and the efficiency of TCP connection can be improved, which are especially suitable for noisy wireless networks since the congestion window "CWND" need not be reduced, and the state of Slow-Start need not be entered, if a data packet is lost due to BER.

More importantly, congestion control of the TCP module of the source node 310 and the destination node 320 can be significantly simplified and easy to control since the use of the CWR flag is abandoned completely. However, by keeping the throughput high, the packet burst may be greater than normal TCP. If Fast Retransfer/Fast Recovery (FRFR) algorithm as described by FRC 2581 is used in conjunction with the NEW-ECN algorithm according to an embodiment of the present invention, the NEW-ECN algorithm may further be modified as follows: (1) when packet loss is detected, FRFR may be invoked. FRFR may be in charge of re-transmission of the lost packet and the transfer of new data packet; (2) the judgement of congestion or transfer error is unchanged; (3) in case of congestion: when FRFR terminates, nothing may be done; and (4) in case of transfer error: when FRFR terminates, set SSTHRESH to CWND before packet loss. By doing this, the TCP module 314 of the source node 310 can recover to its original speed very quickly while efficiently preventing data burst.

Figure 6:
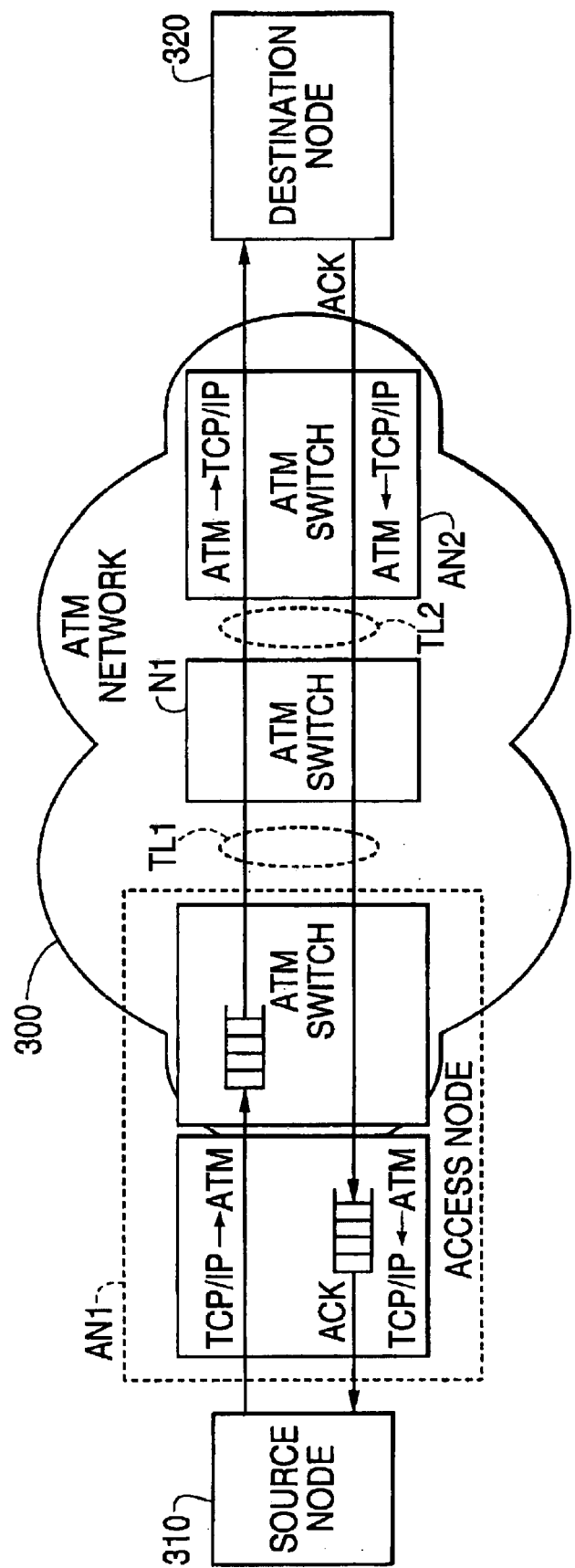
FIG. 6 illustrates one preferred usage implementation of a packet-switched network including an improved ECN mechanism installed therein for controlling congestion according to an embodiment of the present invention.

FIG. 6 illustrates one preferred usage implementation of a packet-switched network including an improved ECN mechanism installed therein for controlling congestion according to an embodiment of the present invention. The packet-switched network may correspond to a TCP over ATM (Asynchronous Transfer Mode) network. ATM is a connection-oriented packet-switching technique adopted by the International Telecommunication Standardization Organization (ITU-T) as backbones for the various parts of TCP/IP networks such as the Internet and wireless or mobile networks. As shown in FIG. 6, a connection between a source node 310 and a destination node 320 (two user terminals) in the TCP over ATM network 300 is shown, i.e. the user terminals using TCP as a transport layer protocol. In addition, two access nodes AN1 and AN2 of the user terminals, one intermediate node N1 and transmission (wire or wireless) lines TL1, TL2 connecting the access nodes are shown. The ECN controller (not shown) employing an ECN algorithm may be installed in each of the access nodes AN1 and AN2 for detecting and notifying the incipient congestion to the destination node 320 in the TCP over ATM network 300 in the same way as described with reference to FIG. 3. Likewise, the NEW-ECN algorithm as described with reference to FIG. 3 may be incorporated into the enhanced TCP module of respective source node 310 and destination node 320 to efficiently improve the throughput of TCP connection of the TCP over ATM network 300.

Figure 7:
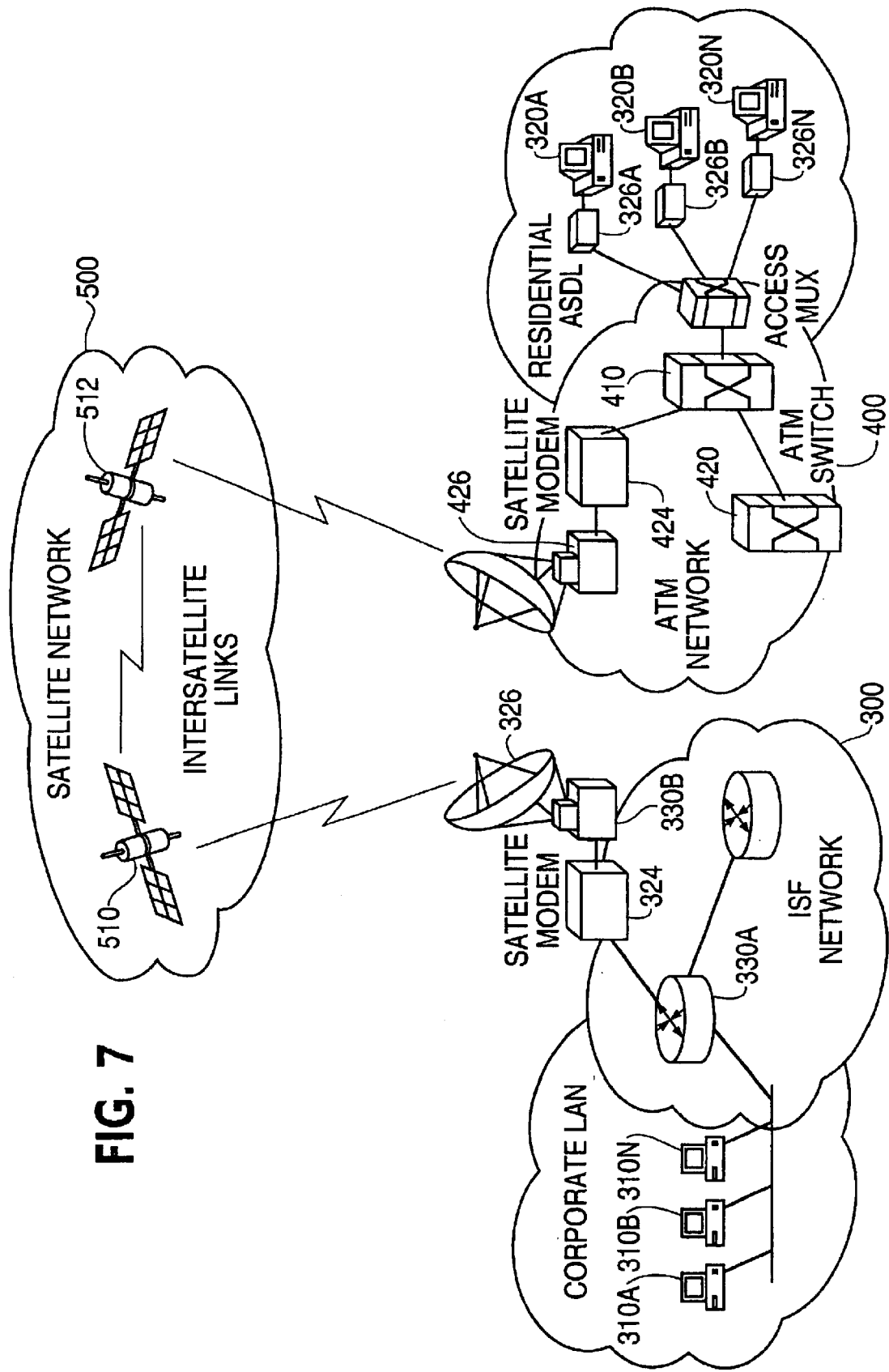
FIG. 7 illustrates another preferred usage implementation of a packet-switched network including an improved ECN mechanism installed therein for controlling congestion according to an embodiment of the present invention.

FIG. 7 illustrates another preferred usage implementation of a packet-switched network including an improved ECN mechanism installed therein for controlling congestion according to an embodiment of the present invention. As shown in FIG. 7, the packet-switched network may correspond to a TCP over ISF network 300, ATM network 400 and a satellite network 500. The ISF network 300 may include several intermediate nodes (routers or communication gateways) 330A–330B, a satellite modem 324 and a transceiver 326. The ATM network 400 may include several ATM switches 410, 412, a satellite modem 424 and a transceiver 426 which interacts with the ISF network 300, via the satellite network 500 including at least a pair of satellites 510, 512. The source node 310A–310N may be selected from a corporate local area network (LAN) for sending/receiving data packets, via the ISF network 300. Likewise, the destination node 320A–320N may be selected from a residential ASDL for sending/receiving data packets, via the ATM network 400. The ECN controller (not shown) employing an ECN algorithm may be installed in each of the intermediate nodes 330A–330B of the ISF network 300 for detecting and notifying the incipient congestion to any one of the destination nodes 320A–320N over the ISF network 300, the ATM network 400 and the satellite network 500 in the same way as described with reference to FIG. 3. Likewise, the NEW-ECN algorithm as described with reference to FIG. 3 may be incorporated into the enhanced TCP module of respective source node 310A–310N and destination node 320A–320N to efficiently improve the throughput of TCP connection of the TCP over ISF network 300, ATM network 400 and a satellite network 500. Once installed in the TCP over ISF network 300, ATM network 400 and a satellite network 500, the NEW-ECN mechanism as described with reference to FIG. 3 can maintain a high data throughput and enhance the efficiency when data packets overflow in the congested routers, while minimizing the high packet loss rate and the number of congestions in the network.

While there have been illustrated and described what are considered to be preferred embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of avoiding congestion in a network, comprising:
    transmitting, at a source node, data packets to a destination node, via at least an intermediate node, each data packet including a Transmission Control Protocol (TCP) header;
    determining, at the intermediate node, if an incipient congestion is encountered, and if the incipient congestion is encountered, setting a Congestion Experienced (CE) flag in each data packet which indicates the incipient congestion to notify the incipient congestion to the destination node;
    receiving, at the destination node, a CE data packet, setting an Explicit Congestion Notification-Echo (ECN-Echo) flag in the TCP header of an acknowledgment (ACK) packet subsequent to the CE data packet received, and sending an ECN-Echo ACK packet back to the source node to inform that the incipient congestion was encountered in the network on the path from the source node to the destination node;
    upon receipt of the ECN-Echo ACK packet, reducing, at the source node, a congestion window and a transmission rate to avoid the congestion, and determining if a packet loss is due to congestion or due to a transmission error, when the incipient congestion is still encountered in the network on the path from the source node to the destination node;
    if the packet loss is due to congestion, re-transmitting, at the source node, only a lost packet to the destination node, via the intermediate node; and
    if the packet loss is due to the transmission error, re-transmitting, at the source node, the lost packet to the destination node, via the intermediate node, while increasing a round-trip timeout (RTO) but maintaining the same congestion window.

2. The method as claimed in claim 1, wherein said ECN-Echo ACK packet is transmitted from the destination node back to the source node without delay, and each CE data packet can only invoke a single ECN-Echo ACK packet, and not a series of ECN-Echo ACK packets.

3. The method as claimed in claim 1, wherein said incipient congestion is encountered, when the average of queue size in the intermediate node exceeds a designated threshold.

4. The method as claimed in claim 1, wherein said network corresponds to a TCP/IP packet-switched network for wireless and/or mobile network applications.

5. The method as claimed in claim 4, wherein, during a TCP connection setup, the source node and the destination node exchange information relating to the use of Explicit Congestion Notification (ECN) for enabling the intermediate node to determine if the incipient congestion is encountered.

6. The method as claimed in claim 1, wherein said packet loss is due to congestion, if there is an ECN-Echo flag in the prior congestion window.

7. The method as claimed in claim 1, wherein said packet loss is due to said transmission error, if there is no ECN-Echo flag in the prior congestion window.

8. The method as claimed in claim 1, wherein said packet loss is due to congestion, when a re-transmission timeout occurs in the source node with ECN-Echo proceedings.

9. The method as claimed in claim 1, wherein said packet loss is due to said transmission error, when a re-transmission timeout occurs in the source node without ECN-Echo proceedings.

10. The method as claimed in claim 1, wherein said congestion window is reduced to halve, and a slow start threshold is reduced to said congestion window to slow the transmission rate to avoid the congestion in said intermediate node, when said ECN-Echo ACK packet is received at said source node.

11. A data network for wireless and/or mobile network applications, comprising:
    a source node for transmitting data packets;
    a destination node for receiving the data packets from the source node; and
    at least one intermediate node disposed between said source node and said destination node, for monitoring the average of queue size of incoming data packets from said source node and providing an Explicit Congestion Notification (ECN) to said destination node;

wherein said destination node, in response to said ECN, sends an ECN-Echo acknowledgment packet back to said source node to inform that congestion was encountered in the network on the path from said source node to said destination node;

wherein said source node, in response to said ECN-Echo acknowledgment packet, reduces a congestion window and a transmission rate to avoid the congestion in said intermediate node, and determines if a packet loss is due to congestion in the intermediate node or due to a transmission error, when congestion is still encountered in the network on the path from said source node to said destination node; and wherein said source node re-transmits only a lost packet to said destination node, via said intermediate node if the packet loss is due to congestion, and alternatively, re-transmits the lost packet to said destination node, via said intermediate node, while increasing a round-trip timeout (RTO) but maintaining the same congestion window if the packet loss is due to the transmission error.

12. The data network as claimed in claim 11, wherein said ECN-Echo ACK packet is transmitted from said destination node back to said source node without delay, and each CE data packet can only invoke a single ECN-Echo ACK packet, and not a series of ECN-Echo ACK packets.

13. The data network as claimed in claim 11, wherein said Explicit Congestion Notification is provided to indicate congestion at said intermediate node, when the average of queue size in the intermediate node exceeds a designated threshold.

14. The data network as claimed in claim 11, wherein said source node and said destination node each comprises a host and a Transmission Control Protocol (TCP) module comprising an enhanced ECN algorithm for congestion avoidance.

15. The data network as claimed in claim 14, wherein said source node and said destination node, during a TCP connection setup, exchange information relating to the use of Explicit Congestion Notification (ECN) for enabling said intermediate node to determine if the congestion is determined in the network.

16. The data network as claimed in claim 11, wherein said source node determines that packet loss is due to congestion, if there is an ECN-Echo flag in the prior congestion window.

17. The data network as claimed in claim 11, wherein said source node determines that packet loss is due to said transmission error, if there is no ECN-Echo flag in the prior congestion window.

18. The data network as claimed in claim 11, wherein said source node determines that packet loss is due to congestion, when a re-transmission timeout occurs with ECN-Echo proceedings.

19. The data network as claimed in claim 11, wherein said source node determines that packet loss is due to said transmission error, when a re-transmission timeout occurs without ECN-Echo proceedings.

20. The data network as claimed in claim 11, wherein said source node reduces the congestion window in halve, and a slow start threshold to said congestion window to slow the transmission rate to avoid the congestion in said intermediate node, when said ECN-Echo ACK packet is received.

21. A computer readable medium having an enhanced Explicit Congestion Notification (ECN) algorithm for wireless network applications, when executed by a host system, performs:

transmitting data packets to a remote system, via an intermediate system which is installed to set a Congestion Experienced (CE) flag in each data packet experiencing congestion;

receiving an ECN-Echo ACK packet sent back from to the remote system, in response to reception of a CE data packet, indicating that congestion was encountered on the path to the remote system;

upon receipt of the ECN-Echo ACK packet, reducing a congestion window and a transmission rate to avoid the congestion in the intermediate system;

determining if a packet loss is due to congestion or due to a transmission error, when congestion is still encountered on the path to the remote system;

if the packet loss is due to congestion, re-transmitting only a lost packet to the remote system, via the intermediate system; and if the packet loss is due to the transmission error, re-transmitting the lost packet to the remote system, via the intermediate system, while increasing a round-trip timeout (RTO) but maintaining the same congestion window.

22. The computer usable medium as claimed in claim 21, wherein said ECN-Echo ACK packet is transmitted from the remote system back to the host system without delay, and each CE data packet can only invoke a single ECN-Echo ACK packet, and not a series of ECN-Echo ACK packets.

23. The computer usable medium as claimed in claim 21, wherein said congestion is experienced, when the average of queue size in the intermediate system exceeds a designated threshold.

24. The computer usable medium as claimed in claim 21, wherein said packet loss is determined due to congestion, if there is an ECN-Echo flag in the prior congestion window.

25. The computer usable medium as claimed in claim 21, wherein said packet loss is determined due to said transmission error, if there is no ECN-Echo flag in the prior congestion window.

26. The computer usable medium as claimed in claim 21, wherein said congestion window is reduced to halve, and a slow start threshold is reduced to said congestion window to slow the transmission rate to avoid the congestion in said intermediate node, when said ECN-Echo ACK packet is received.

* * * * *